US011431758B2

(12) United States Patent
Tamiya et al.

(10) Patent No.: US 11,431,758 B2
(45) Date of Patent: Aug. 30, 2022

(54) FRAUD MONITORING PROGRAM, FRAUD MONITORING APPARATUS, AND INFORMATION PROCESSING APPARATUS

(71) Applicant: FUJITSU LIMITED, Kawasaki (JP)

(72) Inventors: Masahiko Tamiya, Higashikurume (JP); Tatsuro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 692 days.

(21) Appl. No.: 16/272,459

(22) Filed: Feb. 11, 2019

(65) Prior Publication Data
US 2019/0281090 A1 Sep. 12, 2019

(30) Foreign Application Priority Data

Mar. 9, 2018 (JP) .............................. JP2018-042853

(51) Int. Cl.
*G06F 21/55* (2013.01)
*G06F 21/60* (2013.01)
*H04L 9/40* (2022.01)
*G08B 23/00* (2006.01)
*G06F 21/57* (2013.01)

(52) U.S. Cl.
CPC .......... *H04L 63/306* (2013.01); *G06F 21/554* (2013.01); *G06F 21/577* (2013.01); *G06F 21/60* (2013.01); *G08B 23/00* (2013.01); *H04L 63/1416* (2013.01); *H04L 63/20* (2013.01); *H04L 63/308* (2013.01)

(58) Field of Classification Search
CPC ..... H04L 63/20; H04L 63/306; H04L 63/308; H04L 63/1416; G06F 21/554; G06F 21/577; G06F 21/60; G08B 23/00
See application file for complete search history.

(56) References Cited

U.S. PATENT DOCUMENTS 7,401,360 B2 * 7/2008 Ravishankar ......... H04L 63/102
                                                                709/232
7,594,269 B2 * 9/2009 Durham ................... G06F 21/55
                                                                714/38.14
(Continued)

FOREIGN PATENT DOCUMENTS

JP     2004-234390     8/2004
JP     2007-241337     9/2007
(Continued)

OTHER PUBLICATIONS

EPOA—Office Action of European Patent Application No. 19155266.0 dated Jan. 13, 2021.
(Continued)

*Primary Examiner* — Hosuk Song
(74) *Attorney, Agent, or Firm* — Fujitsu Patent Center

(57) ABSTRACT

A fraud monitoring program causes a computer to perform a fraud monitoring process. The process includes steps of: transmitting information on an operation or an act in the computer to a management device via a first network; and outputting an alert in response to detection of a specific event after an instruction to activate an alert notification function is received from the management device which has detected based on the information that a condition for activating the alert notification function in the computer is met.

9 Claims, 9 Drawing Sheets

(56) References Cited

U.S. PATENT DOCUMENTS

| | | | |
|---|---|---|---|
| 8,010,993 B1* | 8/2011 | Bartholomay | G06F 9/45558 726/1 |
| 8,826,422 B2* | 9/2014 | Russell | H04L 51/12 726/22 |
| 10,327,137 B2* | 6/2019 | Molina | H04W 12/06 |
| 10,409,995 B1* | 9/2019 | Wasiq | H04L 63/1433 |
| 10,693,904 B2* | 6/2020 | Lim | H04L 63/1441 |
| 2004/0153673 A1 | 8/2004 | Kitano | |
| 2005/0015624 A1 | 1/2005 | Ginter et al. | |
| 2011/0225650 A1 | 9/2011 | Margolies et al. | |
| 2016/0065602 A1* | 3/2016 | Serban | H04L 67/2842 726/23 |
| 2017/0264628 A1 | 9/2017 | Treat et al. | |
| 2018/0084006 A1* | 3/2018 | Kwan | H04L 63/0227 |
| 2019/0230215 A1 | 7/2019 | Zhu et al. | |

FOREIGN PATENT DOCUMENTS

| | | |
|---|---|---|
| JP | 2008-191857 | 8/2008 |
| JP | 2008-269445 A1 | 11/2008 |
| JP | 2010-211257 | 9/2010 |
| WO | 2017/193515 A1 | 11/2017 |

OTHER PUBLICATIONS

EESR—Extended European Search Report dated May 17, 2019 from corresponding European Patent Application No. 19155266.0.
JPOA—Office Action of Japanese Patent Application No. 2018-042853 dated Sep. 7, 2021 with machine translation.
Japanese Office Action dated Apr. 5, 2022 for corresponding Japanese Patent Application No. 2018-042853, with English Translation, 6 pages.

* cited by examiner

FRAUD MONITORING PROGRAM, FRAUD MONITORING APPARATUS, AND INFORMATION PROCESSING APPARATUS

CROSS-REFERENCE TO RELATED APPLICATION

This application is based upon and claims the benefit of priority of the prior Japanese Patent Application No. 2018-42853, filed on Mar. 9, 2018, the entire contents of which are incorporated herein by reference.

FIELD

The embodiments discussed herein are related to a fraud monitoring program, a fraud monitoring apparatus, and an information processing apparatus.

BACKGROUND

Internal fraud is one of typical causes for leakage of information in an organization such as a company. Thus, a fraud monitoring device which monitors internal fraud is installed in an organization, and when an operation or an act considered to be internal fraud (also simply referred to as fraud operation) is detected by the fraud monitoring device, a client (terminal) who has committed the internal fraud is identified, and an alert (warning) is displayed. Consequently, the opportunity of committing internal fraud is reduced, and leakage of information of the organization to the outside is avoided. Related techniques are disclosed in, for example, Japanese Laid-open Patent Publication Nos. 2010-211257 and 2007-241337.

In such a fraud monitoring technique in the related art, while a client terminal, on which alert display is to be performed, is connected to a predetermined network, a fraud monitoring device performs control of alert display on the client terminal. Thus, when the client terminal, on which alert display is to be performed, is disconnected from the predetermined network, it is difficult to control the client terminal.

In addition, in the fraud monitoring technique in the related art, every time an act leading to internal fraud (for instance, an act of inserting a Universal Serial Bus (USB) memory into a slot) is detected by the fraud monitoring device, an alert is displayed. Such frequent alerts may be viewed as having little importance.

In an aspect, it is aimed to display an alert on a client terminal at appropriate timing.

SUMMARY

According to an aspect of the embodiments, a fraud monitoring program causes a computer to performed a process, the process includes steps of: transmitting information on an operation or an act in the computer to a management device via a first network; and outputting an alert in response to detection of a specific event after an instruction to activate an alert notification function is received from the management device which has detected based on the information that a condition for activating the alert notification function in the computer is met.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
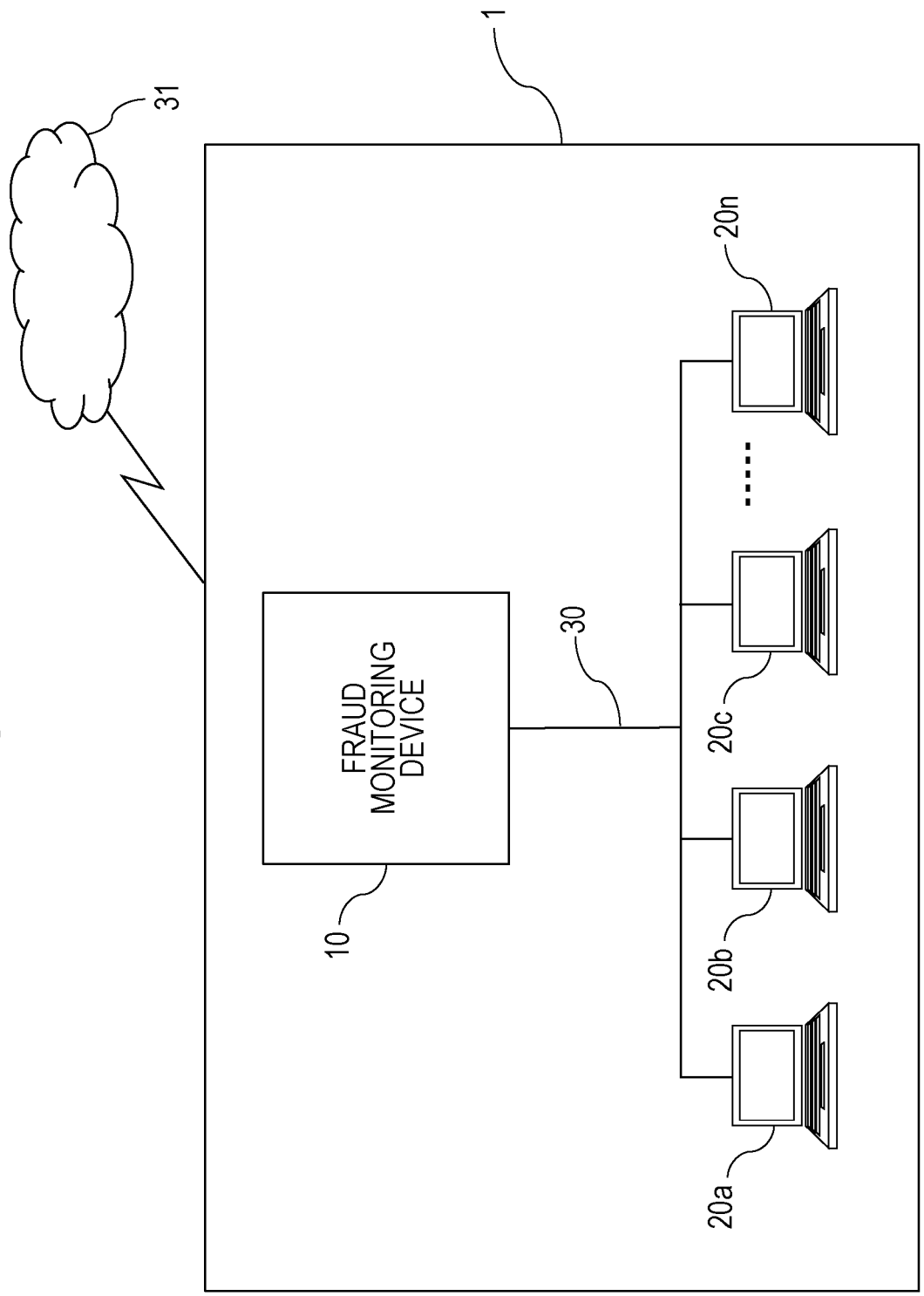
FIG. 1 is a diagram illustrating the hardware configuration of a fraud monitoring system as an example of an embodiment.

Hereinafter, an embodiment of the present disclosure will be described with reference to the drawings. However, the embodiment described below is merely an example, and it is not intended to exclude various modifications and technical applications which are not explicitly described below. For instance, the embodiment may be variously modified and practiced in a range not departing from the spirit of the present disclosure. It is to be noted that in the drawings used in the embodiment below, components labeled with the same symbol indicate the same or similar components unless otherwise stated.

[1] Embodiment

[1-1] A Hardware Configuration Example of a Fraud Monitoring System According to an Embodiment FIG. 1 is a diagram illustrating the hardware configuration of a fraud monitoring system 1 as an example of an embodiment.

As illustrated in FIG. 1, the fraud monitoring system 1 includes fraud monitoring device (server) 10, and one or multiple client terminals 20a, 20b, 20c, . . . , 20n utilized by client users. Hereinafter, when a specific one of the client terminals is identified, the corresponding one of the symbols 20a, 20b, 20c, . . . , 20n is used to indicate the specific client terminal; however, a symbol 20 is used to indicate any client terminal. The fraud monitoring device 10 and the client terminal 20 are connected via an internal network 30 such as an intranet.

Alternatively, a client user may disconnect the client terminal 20 from the internal network 30, and connect the client terminal 20 to an external network 31.

Then, the fraud monitoring device 10 may be also connected to the external network 31 to communicate with, for instance, a terminal (not illustrated) managed by an administrator.

Although the fraud monitoring system 1 includes one fraud monitoring device 10 in FIG. 1, the fraud monitoring system 1 may include multiple fraud monitoring devices 10.

Figure 2:
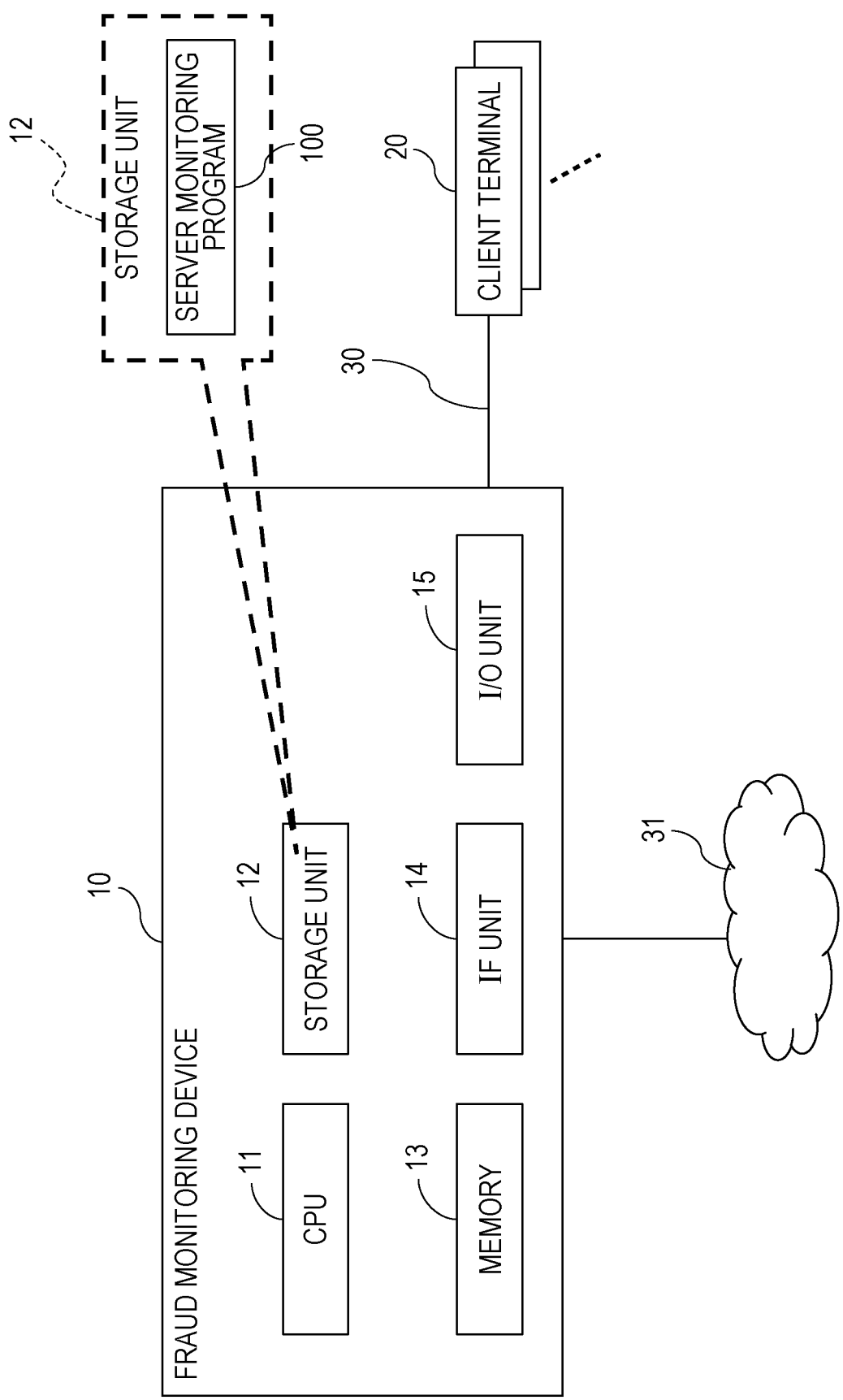
FIG. 2 is a diagram illustrating the hardware configuration of a fraud monitoring device in the fraud monitoring system as an example of the embodiment.

[1-2] A Configuration Example of a Fraud Monitoring Device in a Fraud Monitoring System According to an Embodiment FIG. 2 is a diagram illustrating the hardware configuration of a fraud monitoring device 10 in the fraud monitoring system 1 as an example of the embodiment.

As illustrated in FIG. 2, the fraud monitoring device (server) 10 may include a central processing unit (CPU) 11, a storage unit 12, a memory 13, an interface (IF) unit 14, and an input/output (I/O) unit 15.

The CPU 11 executes an operating system (OS) and programs stored in the later described storage unit 12, and controls the client terminal 20 according to a request inputted from an external device which is not illustrated, for instance, a terminal managed by an administrator. In the embodiment, the CPU 11 executes a server monitoring program 100 described later.

The storage unit 12 is an example of hardware which stores various data and programs. For instance, the storage unit 12 may be used as a secondary storage device of the fraud monitoring device 10, and may store programs such as an OS, firmware, and application, and various data. In addition to a magnetic disk drive such as a hard disk drive (HDD), for instance, a solid state drive (SSD) and storage class memories (SCM) may be used as the storage unit 12. The storage unit 12 may store a program (server monitoring program 100) that implements all or part of various functions of the fraud monitoring device 10.

The memory 13 is an example of hardware which stores various data and programs. A volatile memory, for instance, a RAM such as a Dynamic RAM (DRAM) may be used as the memory 13. It is to be noted that RAM is an abbreviation for Random Access Memory.

The IF unit 14 is an example of a communication interface that performs control of connection and communication with the client terminal 20 via the internal network 30. The fraud monitoring device 10 may include a communication interface that performs communication with a terminal (not illustrated) managed by an administrator, via the external network 31. A program may be downloaded using the communication interface.

The I/O unit 15 may include at least one of an input device such as a mouse and a keyboard, and an output device such as a display and a speaker, for instance.

Figure 3:
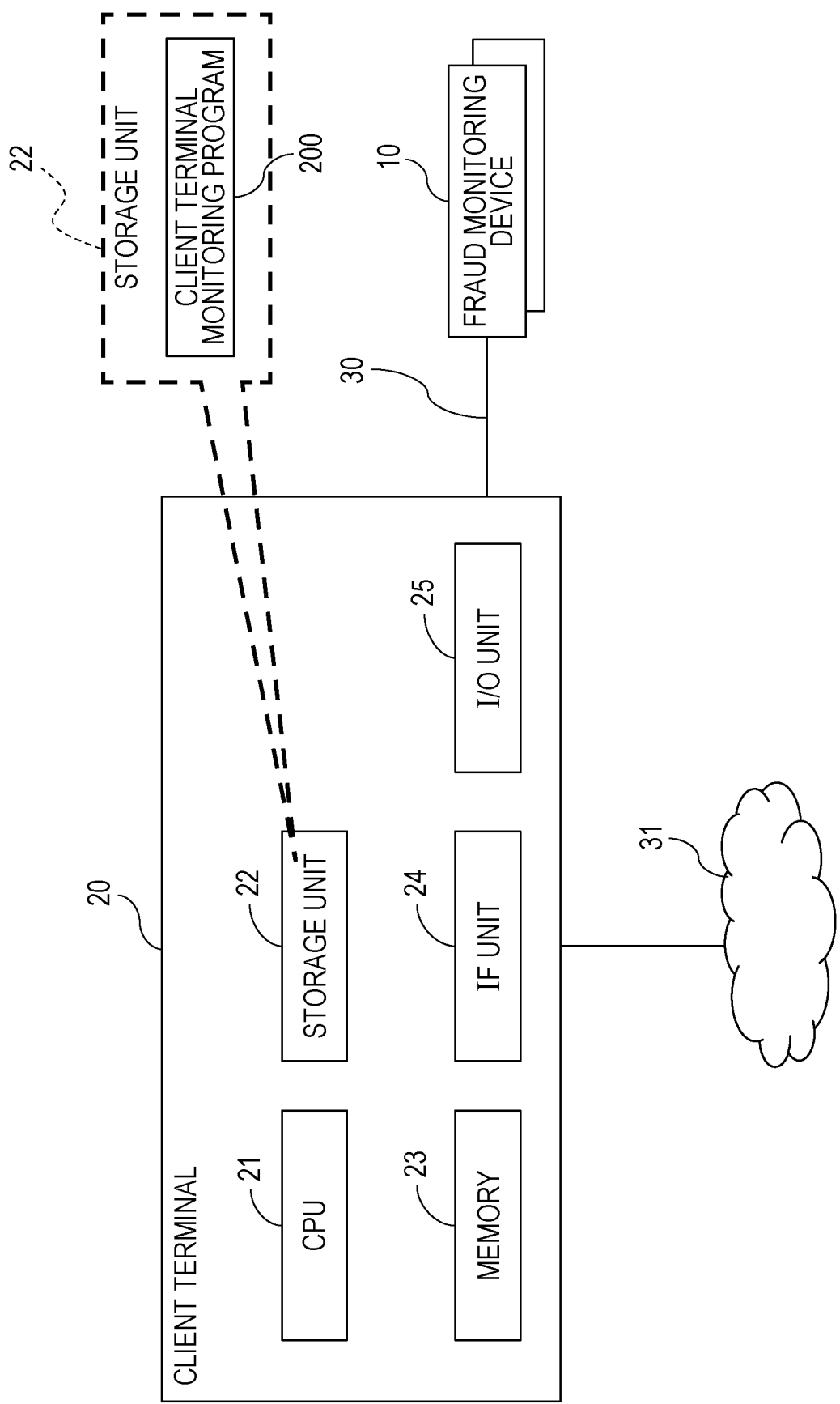
FIG. 3 is a diagram illustrating the hardware configuration of a client terminal in the fraud monitoring system as an example of the embodiment.

[1-3] A Configuration Example of a Client Terminal in a Fraud Monitoring System According to an Embodiment FIG. 3 is a diagram illustrating the hardware configuration of a client terminal 20 in the fraud monitoring system 1 as an example of the embodiment.

As illustrated in FIG. 3, the client terminal 20 may include a CPU 21, a storage unit 22, a memory 23, an IF unit 24, and an I/O unit 25.

The CPU 21 executes an OS and programs stored in the later-described storage unit 22. In the embodiment, the CPU 21 executes the later-described client terminal monitoring program 200.

The storage unit 22 is an example of hardware which stores various data and programs. For instance, the storage unit 22 may be used as a secondary storage device of the client terminal 20, and may store programs such as an OS, firmware, and application, and various data. In addition to a magnetic disk drive such as a HDD, for instance, an SSD and an SCM may be used as the storage unit 22. The storage unit 22 may store all or part of the later-described client terminal monitoring program 200.

The memory 23 is an example of hardware which stores various data and programs. A volatile memory, for instance, a RAM such as a DRAM may be used as the memory 23.

The IF unit 24 is an example of a communication interface that makes connection with the fraud monitoring device 10 via the internal network 30. The client terminal 20 may include a communication interface that performs communication via the external network 31 such as the Internet.

The I/O unit 25 may include at least one of an input device such as a mouse and a keyboard, and an output device such as a display and a speaker, for instance.

Figure 4:
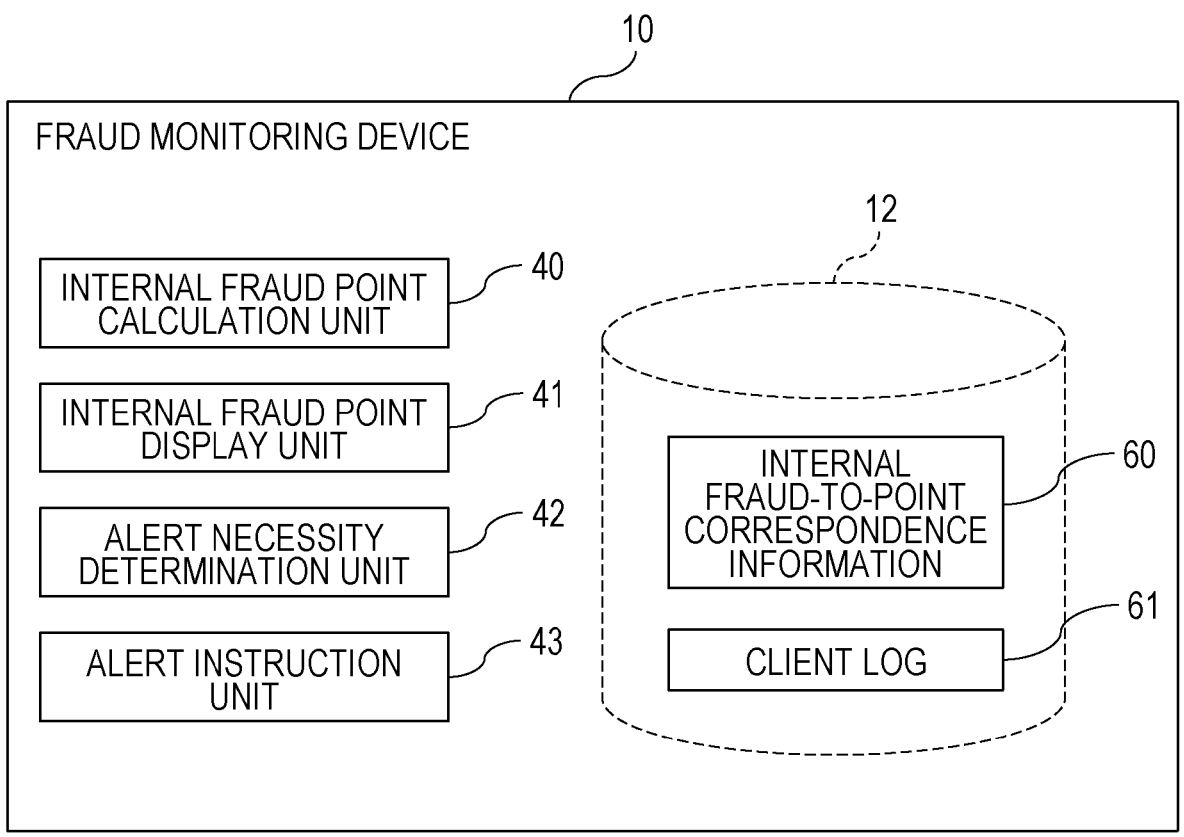
FIG. 4 is a diagram illustrating the functional configuration of the fraud monitoring device in the fraud monitoring system as an example of the embodiment.

[1-4] A Functional Configuration Example in a Fraud Monitoring Device of a Fraud Monitoring System According to an Embodiment FIG. 4 is a diagram illustrating the functional configuration of the fraud monitoring device 10 in the fraud monitoring system 1 as an example of the embodiment illustrated in FIG. 2.

As illustrated in FIG. 4, the fraud monitoring device 10 may include an internal fraud point calculation unit 40, an internal fraud point display unit 41, an alert necessity determination unit 42, and an alert instruction unit 43, as an example.

The internal fraud point calculation unit 40 refers to internal fraud-to-point correspondence information 60 (described later) stored in the storage unit 12 of the fraud monitoring device 10, and calculates an internal fraud point for an operation or an act considered to be internal fraud for each client user. In the embodiment, the operation or the act considered to be fraud is simply referred to as an act, or first internal fraud, and information on the operation or the act considered to be internal fraud is also referred to as first internal fraud information.

In the embodiment, the internal fraud point is a point (value) assigned to each of the acts (the first internal fraud) considered to be internal fraud, and a higher internal fraud point is assigned to an act having higher risk of leakage of information.

The internal fraud point display unit 41 displays the internal fraud point for each client user on a display of the fraud monitoring device 10 by a dashboard function, for instance. When multiple acts considered to be internal fraud are detected in each client terminal 20, the internal fraud point display unit 41 may display an internal fraud point for each of the acts, or the total of internal fraud points.

The alert necessity determination unit 42 determines whether or not the total (accumulated total) of internal fraud points owned by a client user exceeds a predetermined threshold value. As a consequence of the determination, when the total of the internal fraud points exceeds a predetermined threshold value, the alert necessity determination unit 42 determines that an alert has to be outputted.

The threshold value may be set in advance, for instance, by an administrator, and is allowed to be changed during the operation of the system.

The alert instruction unit 43 issues an instruction (alert command) to output an alert to the client terminal 20.

In the embodiment, the processing of the internal fraud point calculation unit 40, the internal fraud point display unit 41, the alert necessity determination unit 42, and the alert instruction unit 43 is implemented by the CPU 11 executing the server monitoring program 100.

The storage unit 12 of the fraud monitoring device 10 stores the internal fraud-to-point correspondence information 60, and a client log 61.

The internal fraud-to-point correspondence information 60 stores the information (the later-described first internal fraud information) on the operation or the act considered to be internal fraud, and an internal fraud point for the information in association with each other. In the embodiment, an internal fraud point for each of the operations or acts stored in the internal fraud-to-point correspondence information 60 is set by an administrator.

The client log 61 stores information on the internal fraud point for each client user. In the embodiment, when multiple operations or acts considered to be internal fraud are detected in a client terminal, an internal fraud point may be stored for each of the operations or the acts, or the total of internal fraud points may be stored.

Figure 5:
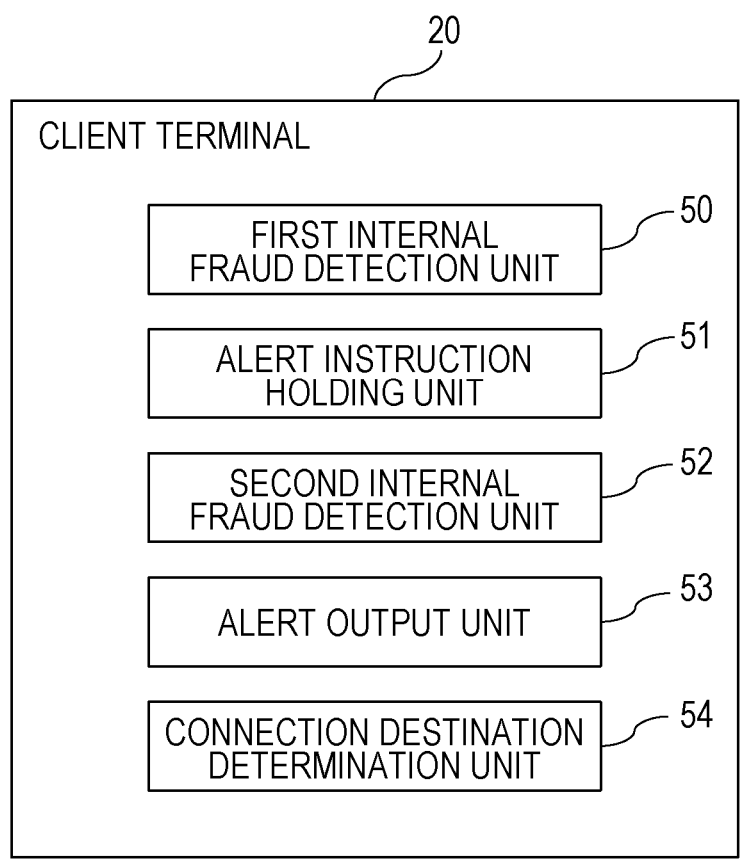
FIG. 5 is a diagram illustrating the functional configuration of the client terminal in the fraud monitoring system as an example of the embodiment.

[1-5] A Functional Configuration Example in a Client Terminal of a Fraud Monitoring System According to an Embodiment FIG. 5 is a diagram illustrating the functional configuration of the client terminal 20 in the fraud monitoring system 1 as an example of the embodiment illustrated in FIG. 3.

As illustrated in FIG. 5, the client terminal 20 according to the embodiment may include a first internal fraud detection unit 50, an alert instruction holding unit 51, a second internal fraud detection unit 52, an alert output unit 53, and a connection destination determination unit 54, as an example.

The first internal fraud detection unit 50 detects an act considered to be internal fraud in the client terminal 20. The first internal fraud detection unit 50 then notifies the fraud monitoring device 10 of information (the first internal fraud information) on the detected act via the internal network 30.

The alert instruction holding unit 51 holds an instruction to output an alert transmitted from the fraud monitoring device 10. In other words, even when an instruction to output an alert is received from the fraud monitoring device 10, the alert instruction holding unit 51 does not immediately output the alert to the client terminal 20, but holds (defers) the instruction (in stand-by).

The second internal fraud detection unit 52 detects a specific event (the later-described second internal fraud) in the client terminal 20. The specific event will be described later.

The alert output unit 53 outputs an alert to the client terminal 20. A specific example of the alert output will be described later. In addition, the alert output unit 53 performs control to continue alert output to the client terminal 20.

The connection destination determination unit 54 determines whether or not the client terminal 20 is connected to the internal network 30. In addition, the connection destination determination unit 54 may determine whether the connection destination of the client terminal 20 is the internal network 30 or the external network 31.

In the embodiment, the processing of the first internal fraud detection unit 50, the alert instruction holding unit 51, the second internal fraud detection unit 52, the alert output unit 53, and the connection destination determination unit 54 is implemented by the CPU 21 executing the client terminal monitoring program 200.

[1-6] The Processing of Control in a Fraud Monitoring System According to an Embodiment The processing of control in the fraud monitoring system 1 as an example of the embodiment as configured above will be described according to the flowchart (steps S1 to S17) illustrated in FIGS. 6 and 7.

Figure 6:
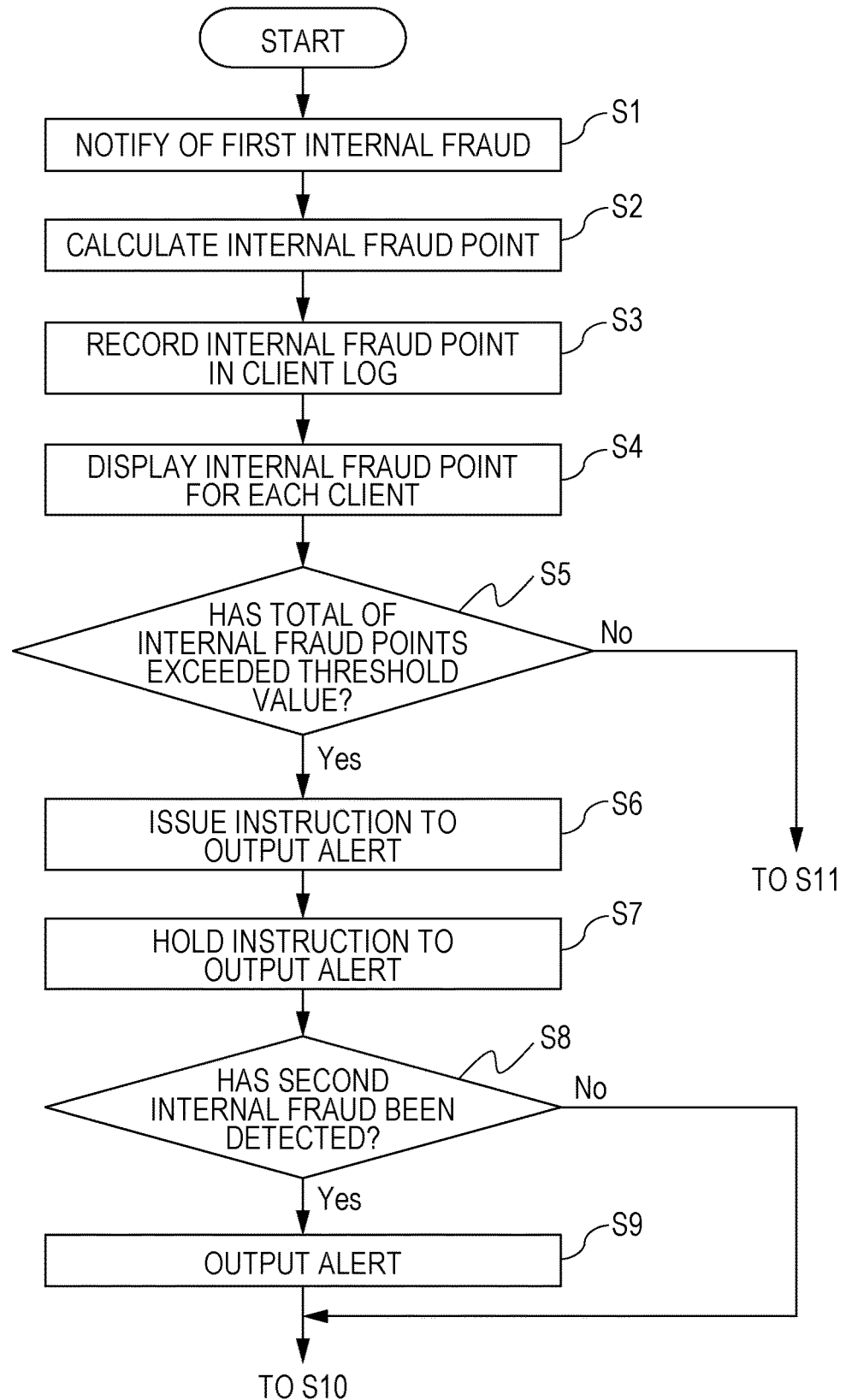
FIG. 6 is a flowchart illustrating the processing of detection of internal fraud and alert output in the fraud monitoring system as an example of the embodiment.

FIG. 6 is a flowchart for explaining the processing of detection of internal fraud and alert output in the fraud monitoring system 1 according to the embodiment. FIG. 7 is a flowchart for explaining the recalculation of an internal fraud point and control processing of alert output in the fraud monitoring system 1 according to the embodiment.

First, the processing of detection of internal fraud and alert output in the client terminal 20 in the fraud monitoring system 1 according to the embodiment will be described according to the flowchart (steps S1 to S9) illustrated in FIG. 6.

Before the processing is started, the server monitoring program 100 has been stored (installed) in the storage unit 12 of the fraud monitoring device 10, and the CPU 11 of the fraud monitoring device 10 has been executing the server monitoring program 100.

The client terminal monitoring program 200 has been stored (installed) in the storage unit 22 of each client terminal 20, and the CPU 21 of the client terminal 20 has been executing the client terminal monitoring program 200.

In addition, the client terminal 20 and the fraud monitoring device 10 are enabled to communicate with each other via the internal network 30.

In step S1, the first internal fraud detection unit 50 of each client terminal 20 detects one or more acts considered to be internal fraud, that is, the first internal fraud in the client terminal 20. The first internal fraud detection unit 50 notifies the fraud monitoring device 10 of information on the detected one or more acts, that is, the first internal fraud information via the internal network 30. In the embodiment, one or more pieces of first internal fraud information detected in a predetermined period are collectively transmitted to the fraud monitoring device 10.

The first internal fraud is defined in advance by an administrator as an act leading to internal fraud in an organization, and may include an act with a high probability of internal fraud. Such specific acts considered to be internal fraud are publicly known, and will not be elaborated upon here.

In the processing of step S1, the first internal fraud detection unit 50 of each client terminal 20 may collectively transmit one or more pieces of first internal fraud information detected in a predetermined period to the fraud monitoring device 10. Alternatively, each time a first internal fraud is detected, the first internal fraud detection unit 50 of each client terminal 20 may transmit the first internal fraud to the fraud monitoring device 10.

In subsequent step S2, the internal fraud point calculation unit 40 of the fraud monitoring device 10 calculates an internal fraud point for the pieces of first internal fraud information notified in step S1.

Specifically, first, the internal fraud point calculation unit 40 refers to the internal fraud-to-point correspondence information 60 stored in the storage unit 12 of the fraud monitoring device 10, and retrieves an internal fraud point for each of the pieces of first internal fraud information notified in step S1. The internal fraud point calculation unit 40 then calculates the total of the retrieved internal fraud points for each client user.

Subsequently, based on a client user identifier, the internal fraud point calculation unit 40 retrieves an internal fraud point of the relevant client user from the client log 61 stored in the storage unit 12. The internal fraud point calculation unit 40 then adds the total of the internal fraud points of the pieces of first internal fraud information calculated in step S2 to the retrieved internal fraud point of the relevant client user.

Consequently, the total of internal fraud points for one or more acts considered to be internal fraud, which have been conducted by a client user, is determined. A higher value of the total indicates a higher risk of leakage of information.

In subsequent step S3, the internal fraud point calculation unit 40 updates (records) the client log 61 of the client user stored in the storage unit 12 using an internal fraud point obtained as a result of adding the total of the internal fraud points.

In subsequent step S4, the internal fraud point display unit 41 of the fraud monitoring device 10 displays the (total of) internal fraud points for each client user calculated in step S3 on the display of the fraud monitoring device 10 by a dashboard function, for instance. Consequently, it is possible for an administrator to browse the (total of) internal fraud points for each client user, and to identify a client user with potentially malicious intention.

In subsequent step S5, the alert necessity determination unit 42 of the fraud monitoring device 10 determines whether or not the total of the internal fraud points owned by the client user for whom the first internal fraud has been detected in step S1 exceeds a predetermined threshold value. The threshold value may be set in advance, for instance, by an administrator, and is allowed to be changed during the operation of the system.

If the total of the internal fraud points of the client user exceeds a predetermined threshold value in step S5 (see Yes route in step S5), the processing proceeds to step S6. On the other hand, if the total of the internal fraud points does not exceed a predetermined threshold value (see No route in step S5), the processing proceeds to step S11 illustrated in FIG. 7.

In step S6, the alert instruction unit 43 of the fraud monitoring device 10 issues an instruction (output command) to output an alert to the client terminal 20 of the client user for whom the first internal fraud has been detected in step S1.

In subsequent step S7, the alert instruction holding unit 51 of the client terminal 20 holds the instruction to output an alert transmitted from the fraud monitoring device 10. In other words, even when an instruction to output an alert is received from the fraud monitoring device 10, the alert instruction holding unit 51 does not immediately output the alert to the client terminal 20, but holds the instruction (in stand-by).

Specifically, although an instruction to output an alert issued by the alert instruction unit 43 of the fraud monitoring device 10 instructs the client terminal 20, which has received the instruction, to output an alert, the output of an alert to the client terminal 20 stays in stand-by until further conditions are met. Thus, a function (alert notification function) preferably used for alert notification is prepared in the client terminal 20 so that alert notification may be made when further conditions are met. For instance, as preparation for the alert notification function, objects are instantiated so that the alert notification function is activated. Therefore, an instruction to output an alert issued by the alert instruction unit 43 may be considered as an instruction to activate the alert notification function in the client terminal 20.

Similarly, since an instruction to activate the alert notification function in the client terminal 20 is triggered by detection of the first internal fraud, the detection of the first internal fraud is also a condition for activating the alert notification function in the client terminal 20.

In subsequent step S8, the second internal fraud detection unit 52 of the client terminal 20 checks to see if a specific event in the client terminal 20 has been detected. When a specific event has been detected as a result of the check (see Yes route in step S8), the processing proceeds to step S9.

In the embodiment, the specific event is different from the first internal fraud, and may be an operation or an act having a higher risk of leakage of information than the risk of leakage of the first internal fraud detected in step S1. In the embodiment, the specific event is also referred to as the second internal fraud.

The specific event detected in step S8 may be, for instance, an operation by a client user to transmit an e-mail with an attached file to the outside of an organization, and an operation to upload data using application such as a web browser.

The specific event may be an operation performed by a client user, such as disconnecting the client terminal 20 from a predetermined network (for instance, the internal network 30), reconnecting the client terminal 20 again to the predetermined network and transmitting data after the disconnection.

In addition, the specific event may be an operation performed by a client user, such as connecting to a specific network (for instance, the external network 31) via a wireless local area network (LAN) such as Wi-Fi, and connecting to an external device via the specific network.

In addition, the specific event may be an operation performed by a client user, such as inserting a USB memory into the client terminal 20, copying data to the USB memory, and writing data onto a magnetic disk such as a CD or a DVD.

If the second internal fraud detection unit 52 of the client terminal 20 does not detect one of the specific events as described above in the client terminal 20 in step S8 (see No route in step S8), the processing skips step S9 and proceeds to step S10. It is to be noted that in the embodiment, the second internal fraud detection unit 52 determines whether or not a specific event has been detected within a predetermined period.

In step S9, the alert output unit 53 of the client terminal 20 outputs an alert to the client terminal 20. For instance, on the display of the client terminal 20, the alert output unit 53 displays a message indicating that an act considered to be internal fraud has been performed, or a message indicating that an act with a high probability of internal fraud has been detected. Alternatively, an alert may be issued by voice via a speaker of the client terminal 20.

As described above, the processing in steps S7 to S9 illustrated in FIG. 6 is performed, and thus even when an act considered to be internal fraud is performed in the client terminal 20, the client terminal 20 is not immediately notified of an alert. Only after a specific event is detected in step S8, the client terminal 20 is notified of an alert. This enables an alert to be displayed at appropriate timing without losing the significance of the alert.

Since the processing in steps S7 to S9 is performed by the client terminal monitoring program 200, the client terminal 20 is notified of an alert even when the client terminal 20 is not connected to the internal network 30. In other words, even when the client terminal 20 is not connected to the internal network 30, it is possible to control the client terminal 20. Consequently, any client user disconnected from the internal network 30 is made to feel that the client user is being monitored, and thus a deterrent effect on internal fraud may be expected.

In the embodiment, when the first internal fraud detection unit 50 detects multiple operations considered to be internal fraud in step S1, the fraud monitoring device 10 is notified of the multiple operations collectively. However, each time the first internal fraud is detected, the fraud monitoring device 10 may be notified of the first internal fraud. In this case, the processing in steps S1 to S9 may be repeatedly performed within in a predetermined period.

Next, the recalculation of an internal fraud point and control processing of alert output in the fraud monitoring system 1 according to an embodiment will be described according to the flowchart (steps S10 to S17) illustrated in FIG. 7.

Figure 7:
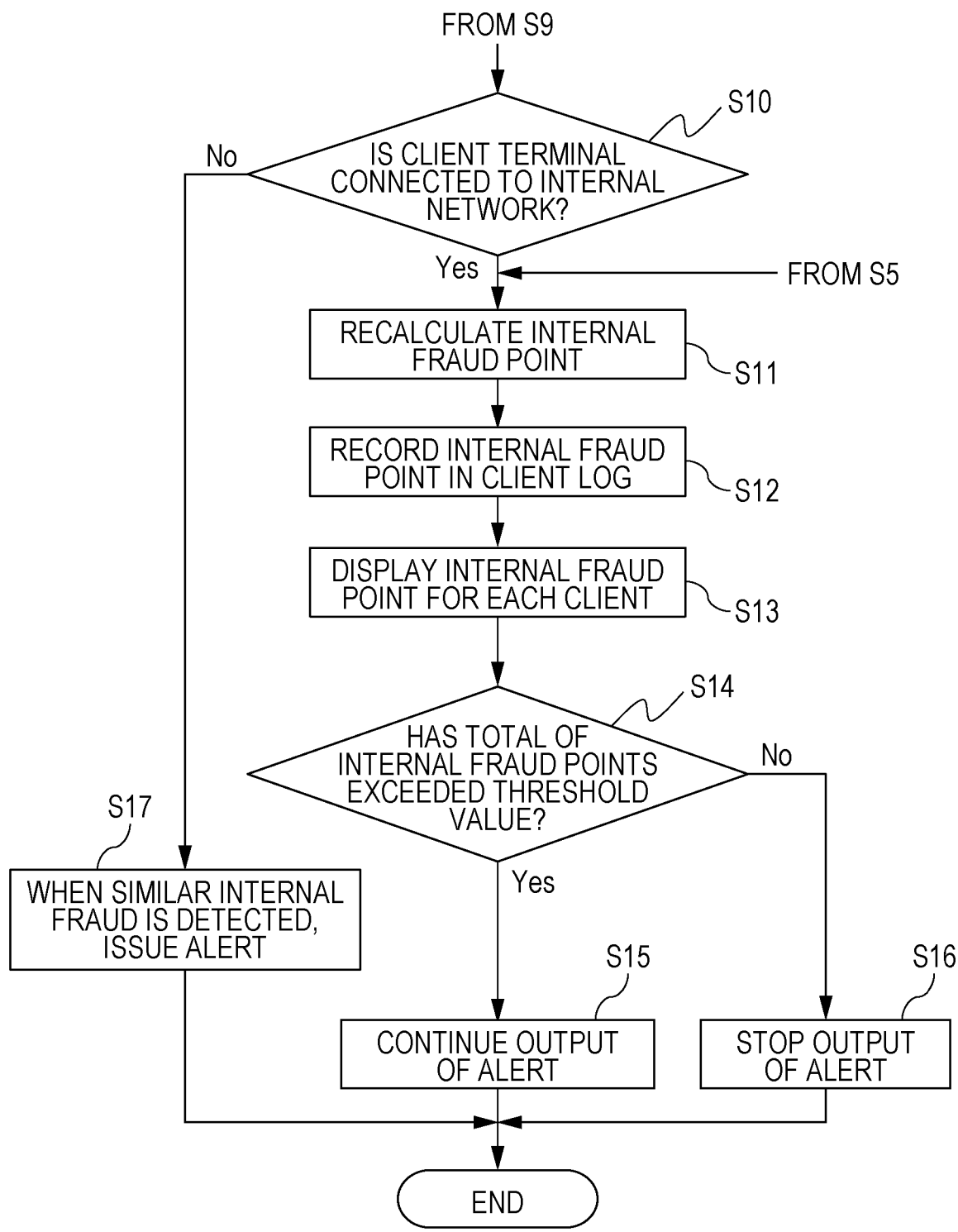
FIG. 7 is a flowchart illustrating the recalculation of internal fraud point and the control processing for alert output in the fraud monitoring system as an example of the embodiment.

After the client terminal 20 outputs an alert in step S9 illustrated in FIG. 6, the processing proceeds to step S10 illustrated in FIG. 7.

In step S10 illustrated in FIG. 7, the connection destination determination unit 54 of the client terminal 20 determines whether or not the client terminal 20 is connected to the internal network 30.

If it is determined in step S10 that the client terminal 20 is connected to the internal network 30 (see Yes route in step S10), the processing proceeds to step S11. The same processing as step S1 described above is performed. Specifically, the first internal fraud detection unit 50 of the client terminal 20 notifies the fraud monitoring device 10 of one or more pieces of first internal fraud information detected in the client terminal 20, via the internal network 30.

In step S11, the first internal fraud detection unit 50 of the client terminal 20 also transmits a client user identifier to the fraud monitoring device 10 along with the detected first internal fraud information.

The internal fraud point calculation unit 40 of the fraud monitoring device 10 then performs the same processing as step S2 described above, and recalculates the internal fraud point of the client user.

Specifically, the internal fraud point calculation unit 40 refers to the internal fraud-to-point correspondence information 60 stored in the storage unit 12 of the fraud monitoring device 10, and retrieves an internal fraud point for each the pieces of first internal fraud information detected by the first internal fraud detection unit 50 in step S10. The internal fraud point calculation unit 40 then calculates the total of the retrieved internal fraud point for each client user.

Subsequently, based on a client user identifier, the internal fraud point calculation unit 40 retrieves an internal fraud point of the client user from the client log 61 stored in the storage unit 12 of the fraud monitoring device 10. The internal fraud point calculation unit 40 then performs recalculation by adding the total of the internal fraud points of the pieces of first internal fraud information calculated in step S11 to the retrieved internal fraud point of the client user.

In subsequent step S12, the internal fraud point calculation unit 40 updates (records) the client log 61 of the client user stored in the storage unit 12 using an internal fraud point obtained as a result of the recalculation.

In subsequent step S13, the internal fraud point display unit 41 of the fraud monitoring device 10 displays the (total of) internal fraud points for each client user obtained by recalculation in step S12 on, for instance, a dashboard of the display of the fraud monitoring device 10.

In subsequent step S14, the alert necessity determination unit 42 of the fraud monitoring device 10 determines whether or not the total of the internal fraud points owned by the client user for whom the first internal fraud has been detected in step S10 exceeds a predetermined threshold value. The threshold value may be set in advance, for instance, by an administrator, and is allowed to be changed during the operation of the system. In addition, the threshold value may be set to a value different from the threshold value used in step S5.

If the total of the internal fraud points of the client user exceeds a predetermined threshold value in step S14 (see Yes route in step S14), the processing proceeds to step S15.

In step S15, the alert instruction unit 43 of the fraud monitoring device 10 issues an instruction to continue output of an alert to the client user for whom the first internal fraud has been detected in step S10.

The alert output unit 53 of the client terminal 20 receives an instruction to continue output of an alert from the alert instruction unit 43, and continues output of an alert in the client terminal 20. For instance, when the alert output unit 53 displays an alert on the display of the client terminal 20 in step S9, the alert output unit 53 continues to display the alert. For instance, when the alert output unit 53 notifies of an alert by voice from a speaker of the client terminal 20 in step S9, the notification is continued. The processing is then completed.

On the other hand, in step S14, when the total of the internal fraud points of the client user does not exceed a predetermined threshold value (see No route in step S14), the processing proceeds to step S16.

In step S16, the alert instruction unit 43 of the fraud monitoring device 10 issues an instruction to cancel the output of an alert to the client terminal 20 of the client user for whom the first internal fraud has been detected in step S10.

The alert output unit 53 of the client terminal 20 cancels the output of an alert, in other words, stops the output of an alert in the client terminal 20.

The alert output unit 53 receives an instruction to cancel the output of an alert from the alert instruction unit 43, and performs control to stop the output of the alert in the client terminal 20. The processing is then completed.

If the connection destination determination unit 54 of the client terminal 20 determines that the client terminal 20 is not connected to the internal network 30 in step S10 (see No route in step S10), the processing proceeds to step S17.

In step S17, when the second internal fraud detection unit 52 of the client terminal 20 detects similar second internal fraud and the alert has been already outputted in step S9 illustrated in FIG. 6, the processing is continued (output of the alert is continued). The processing is then completed.

In step S17, when the second internal fraud detection unit 52 of the client terminal 20 detects similar second internal fraud and the alert has not been outputted in step S9 illustrated in FIG. 6, the alert is outputted. The processing is then completed.

Although the specific details of the processing of recalculation in step S11 illustrated in FIG. 7 are the same as in the processing in step S2 illustrated in FIG. 6, the internal fraud point recalculated in step S11 may be different from the internal fraud point calculated in step S2. For instance, when a client user stops an act which has been performed and is considered to be internal fraud in response to the output of an alert in step S9, an internal fraud point corresponding to the stopped act is subtracted from the total by the recalculation in step S11. In other words, when a client user, who has performed an act considered to be internal fraud, changes the client user's act, the display of the alert is cancelled in step S16.

The processing in step S17 illustrated in FIG. 7 is performed by the client terminal monitoring program 200. Therefore, also in the client terminal 20 disconnected from the internal network 30, when an act similar to a detected act is detected, the output of the alert is repeated. Thus, it is possible to make any client user disconnected from the internal network 30 feel that the client user is being monitored.

[1-7] Effects

As described above in the fraud monitoring system 1 of the embodiment, even when an act (the first internal fraud) considered to be internal fraud is detected, the alert instruction holding unit 51 of the client terminal 20 does not immediately output an alert to a client, but holds the alert. Only after a specific event (the second internal fraud) is detected, the alert output unit 53 of the client terminal 20 notifies a client of an alert. This enables an alert to be displayed at appropriate timing without losing the significance of the alert.

In the fraud monitoring system 1 of the embodiment, after an alert is outputted in a client terminal 20, the internal fraud point calculation unit 40 of the fraud monitoring device 10 recalculates the internal fraud point of the corresponding client user. When an internal fraud point as a result of the recalculation does not exceed a predetermined threshold value, the alert instruction unit 43 of the fraud monitoring device 10 cancels (stops) the output of an alert. Thus, when a client user stops an act which has been performed and is considered to be internal fraud in response to the output of an alert, it is possible to stop the display of the alert and cancel the alert at appropriate timing.

Furthermore, in the fraud monitoring system 1 of the embodiment, the client terminal monitoring program 200 is installed in the client terminal 20, and the second internal fraud detection unit 52 and the alert output unit 53 are implemented by the client terminal monitoring program 200. Therefore, even when the client terminal 20 is not connected to the internal network 30, detection of a specific event (the second internal fraud) made by the second internal fraud detection unit 52 allows the alert output unit 53 to (continue the) display an alert. Consequently, even when the client terminal 20 is disconnected from the internal network 30, it is possible to continue control of alert display on the client terminal 20 as well as to make the client user feel that the client user is being monitored.

In the fraud monitoring system 1 of the embodiment, the second internal fraud detection unit 52 of the client terminal 20 detects the second internal fraud, which is an act having higher risk of leakage of information than the risk of leakage of the first internal fraud, for instance, an operation of connecting to the external network 31. In this manner, the second internal fraud detection unit 52 of the client terminal 20 detects the second internal fraud, thereby making it possible to identify a client user which has performs an act with a high probability of internal fraud, for instance, an act with a high possibility of leaking information to the outside.

[2] Modification of Embodiment

In FIGS. 6 and 7, the processing of outputting or canceling an alert based on the first internal fraud or the second internal fraud detected in the fraud monitoring system 1 has been described. In an embodiment illustrated in FIGS. 6 and 7, an act (step S1) considered to be internal fraud may be included in the range of assigned work a client user or may be authorized by the organization. Thus, in the present modification, in the above-described situation, exception handling is provided so that control is performed to avoid the output of an alert.

Figure 8:
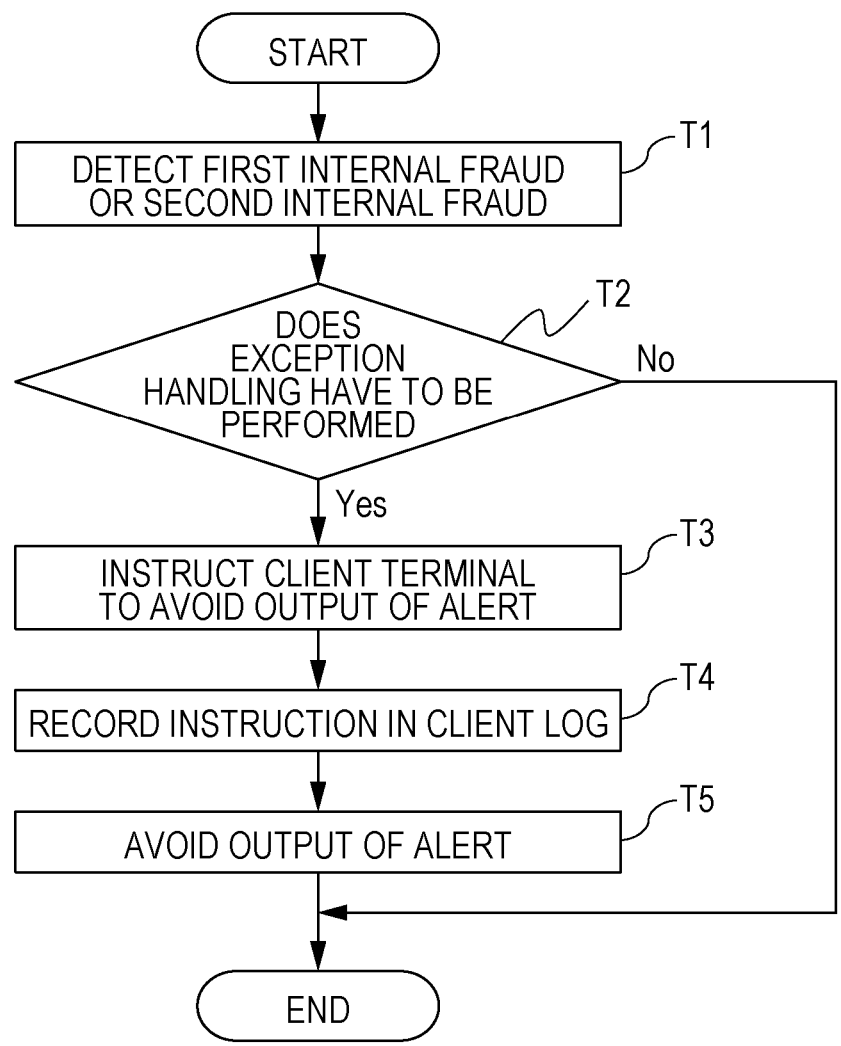
FIG. 8 is a flowchart illustrating the exception handling in a fraud monitoring system as a modification.
Figure 9:
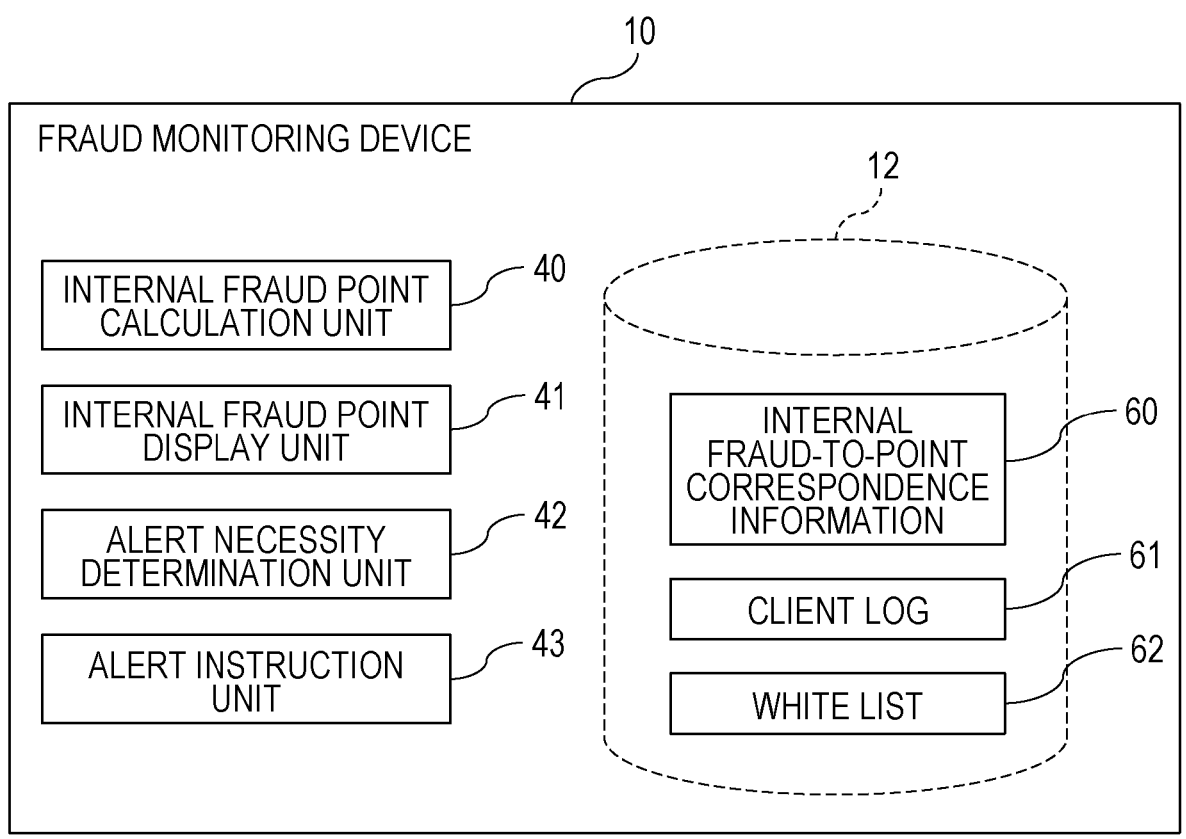
FIG. 9 is a diagram illustrating the functional configuration of a fraud monitoring device in the fraud monitoring system as the modification.

[2-1] Exception Handling in the Fraud Monitoring System According to Modification FIG. 8 is a flowchart illustrating the exception handling in a fraud monitoring system 1 according to a modification. FIG. 9 is a diagram illustrating the functional configuration of a fraud monitoring device 10 in the fraud monitoring system 1 according to the modification. The exception handling in the fraud monitoring system 1 according to the modification will be described according to the flowchart (steps T1 to T5) illustrated in FIG. 8.

Before the processing is started, it is assumed that the storage unit 12 of the fraud monitoring device 10 stores a white list 62 for registering authorized client information for the exception handling as illustrated in FIG. 9.

In the embodiment, when there is a possibility that a client user performs an operation or an act considered to be internal fraud as the assigned work, the client user informs an administrator or the like of the possibility. The administrator or the like acknowledges that the client user is an authorized client for the exception handling, and registers information (for instance, a client user identifier) on the client user and an operation or an act as the assigned work in the white list 62 in association with each other. For the registration in the white list 62, authorization may be obtained from a superior, or checking is performed to see if an operation is authorized as the assigned work, but the authorization is not limited to this.

It is to be noted that, in FIG. 9, each component labeled with the same symbol as a previously-mentioned symbol indicates the same component as the previously-mentioned component and will not be elaborated upon here.

In step T1 illustrated in FIG. 8, the first internal fraud detection unit 50 detects the first internal fraud in the client terminal 20 of a client user who performs an act considered to be internal fraud as the assigned work.

In subsequent step T2, the alert necessity determination unit 42 of the fraud monitoring device 10 refers to the white list 62 stored in the storage unit 12 determines whether or not the information on the client user for whom the first internal fraud has been detected in step T1 is stored in the white list 62.

Specifically, the alert necessity determination unit 42 checks to see if information on the first internal fraud detected in step T1 and the identifier of the client are stored in the white list 62 in association with each other. If a result of the checking confirms that the information on the first internal fraud detected in step T1 and the identifier of the client are stored in the white list 62 in association with each other, the alert necessity determination unit 42 determines that the exception handling has to be performed.

If the alert necessity determination unit 42 determines in step T2 that the exception handling has to be performed (see Yes route in step T2), the processing proceed to step T3.

In step T3, the alert instruction unit 43 of the fraud monitoring device 10 instructs the client terminal 20 to avoid the output of an alert.

In subsequent step T4, the alert necessity determination unit 42 records issuance of the instruction to avoid the output of an alert in the client log 61 stored in the storage unit 12.

In subsequent step T5, the alert output unit 53 of the client terminal 20 receives an instruction to avoid output of an alert from the alert instruction unit 43, and performs control (not to output) to avoid the output of an alert in the client terminal 20, and completes the processing.

On the other hand, if the alert necessity determination unit 42 determines in step T2 that the exception handling does not have to be performed (see No route in step T2), the processing illustrated in steps T3 to T5 in FIG. 8 is not performed, and the processing is completed. The processing proceeds to normal alert notification processing (for instance, the processing in step S2 or S9 illustrated in FIG. 6).

[2-2] Effects

As described above, in the fraud monitoring system 1 of the modification, when there is a possibility that an act considered to be internal fraud is performed as the assigned work of a client user, the act and the client user are registered in the white list 62 in association with each other. Consequently, it is possible to avoid outputting an alert to the client terminal 20 of a client user with no malicious intention, and to control alert display in an appropriate manner.

[3] Others

The technique according to the embodiment and the modification described above may be practiced by making modifications or changes as follows.

In an embodiment described above, the internal fraud point is calculated for each client user. However, the internal fraud point may be calculated for each client terminal 20. In this case, the first internal fraud detection unit 50 of the client terminal 20 may transmit information for identifying the client terminal 20 along with the first internal fraud information. The storage unit 12 of the fraud monitoring device 10 may store the log for each client terminal 20.

In the modification described above, when there is a possibility that an act considered to be internal fraud is performed as the assigned work of a client user, an alert is not be outputted. However, the alert control processing illustrated in FIGS. 6 and 7 may be performed on such a client user. In this case, the white list 62 stored in the storage unit 12 is referred to, and when a client user is registered in the white list 62, a threshold value higher than the threshold values of other client users may be set in the processing in steps S5 and S14.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a fraud monitoring program causing a computer to execute a process comprising:
transmitting information on an operation or an act in the computer to a management device via a first network;
activating an alert notification in the computer when receiving, via the first network, an instruction to activate an alert notification function from the management device which has detected based on the information that a condition for activating the alert notification function in the computer is met; and
outputting an alert in response to detection of a specific event if the alert notification function is activated.

2. The recording medium according to claim 1, wherein the specific event is one of disconnection from the first network, a data transmission event after disconnection from the first network, a connection event between the computer and the second network, and a connection event with an external device.

3. The recording medium according to claim 1, wherein the operation or the act which meets the condition for activating the alert notification function in the computer is an operation or act different from the specific event in the computer.

4. An information processing device, comprising:
a memory, and
a processor coupled to the memory and configured to:
transmit information on an operation or an act in the processor to a management device via a first network; and
activate an alert notification function in the processor when receiving, via the first network, an instruction to activate an alert notification function from the management device which has detected based on the information that a condition for activating the alert notification function in the processor is met; and
output an alert in response to detection of a specific event if the alert notification function is activated.

5. The information processing device according to claim 4, wherein the specific event is one of disconnection from the first network, a data transmission event after disconnection from the first network, a connection event between the processor and the second network, and a connection event with an external device.

6. The information processing device according to claim 4, wherein the operation or the act which meets the condition for activating the alert notification function in the processor is an operation or act different from the specific event in the processor.

7. A fraud monitoring device comprising:
a memory, and
a processor coupled to the memory and configured to:
receive information on an operation or an act in a computer via a first network; and
transmit an instruction to activate an alert notification function in the computer to the computer when having detected, based on the received information, that a condition for activating the alert notification function in the computer is met, so that the computer outputs an alert in response to detection of a specific event if the alert notification function is activated.

8. The fraud monitoring device according to claim 7, the processor is further configured to calculate a sum of values each corresponding to the received information, and
when the calculated sum becomes equal to or greater than a predetermined threshold, the instruction to activate the alert notification function is transmitted.

9. The fraud monitoring device according to claim 8, the processor is further configured to transmit an instruction to cancel the alert notification function to the computer when the calculated sum becomes less than the predetermined threshold.

* * * * *